US008945277B1

(12) United States Patent
Xiong et al.

(10) Patent No.: US 8,945,277 B1
(45) Date of Patent: Feb. 3, 2015

(54) ADVANCED FIRE-RESISTANT FORMS OF ACTIVATED CARBON AND METHODS OF ADSORBING AND SEPARATING GASES USING SAME

(75) Inventors: Yongliang Xiong, Carlsbad, NM (US); Yifeng Wang, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1161 days.

(21) Appl. No.: 12/896,096

(22) Filed: Oct. 1, 2010

(51) Int. Cl.
*B01D 53/02* (2006.01)

(52) U.S. Cl.
USPC ................................................ 95/90; 96/108

(58) Field of Classification Search
CPC .............. C01B 31/08–31/14; B01D 39/2055; B01D 39/2062; B01D 59/22; B01D 59/26
USPC ................................................ 95/90; 96/108
See application file for complete search history.

(56) References Cited

U.S. PATENT DOCUMENTS

| | | | | |
|---|---|---|---|---|
| 2,822,304 | A * | 2/1958 | Gillmore et al. | 127/55 |
| 4,111,833 | A * | 9/1978 | Evans | 502/401 |
| 4,190,696 | A * | 2/1980 | Hart et al. | 2/243.1 |
| 4,458,030 | A * | 7/1984 | Manabe et al. | 502/183 |
| 4,752,397 | A * | 6/1988 | Sood | 210/662 |
| 5,253,660 | A * | 10/1993 | Dixit et al. | 131/365 |
| 6,440,196 | B1 * | 8/2002 | Chiappini et al. | 95/45 |
| 8,173,255 | B2 * | 5/2012 | Basfar et al. | 428/379 |
| 2011/0166279 | A1 * | 7/2011 | Basfar et al. | 524/404 |

OTHER PUBLICATIONS

Suzin, Y. et al. "Characterizing the Ignition Process of Activated Carbon," *Carbon*, vol. 37 (1999), pp. 335-346, USA.

Xiong, Y. et al. "Development of Nano-composite Materials with High Absorption Capacities for Noble Gases," Sandia National Laboratories, Poster presentation at Fuel Cycle Annual meeting, Albuquerque, NM, Oct. 20-22, 2009.

Xiong, Y. et al. "Adsorption Kinetics of Noble Gases on Various Materials with High Adsorption Capacities Determined from Gravimetric Method", Oral Presentation at Integrated Radioactive Waste Management in Future Fuel Cycles Conference, Nov. 9-12, 2009, Charleston, South Carolina, USA.

* cited by examiner

*Primary Examiner* — Christopher P Jones
(74) *Attorney, Agent, or Firm* — Daniel J. Jenkins

(57) ABSTRACT

Advanced, fire-resistant activated carbon compositions useful in adsorbing gases; and having vastly improved fire resistance are provided, and methods for synthesizing the compositions are also provided. The advanced compositions have high gas adsorption capacities and rapid adsorption kinetics (comparable to commercially-available activated carbon), without having any intrinsic fire hazard. They also have superior performance to Mordenites in both adsorption capacities and kinetics. In addition, the advanced compositions do not pose the fibrous inhalation hazard that exists with use of Mordenites. The fire-resistant compositions combine activated carbon mixed with one or more hydrated and/or carbonate-containing minerals that release $H_2O$ and/or $CO_2$ when heated. This effect raises the spontaneous ignition temperature to over 500° C. in most examples, and over 800° C. in some examples. Also provided are methods for removing and/or separating target gases, such as Krypton or Argon, from a gas stream by using such advanced activated carbons.

5 Claims, 11 Drawing Sheets

US 8,945,277 B1

ADVANCED FIRE-RESISTANT FORMS OF ACTIVATED CARBON AND METHODS OF ADSORBING AND SEPARATING GASES USING SAME

STATEMENT OF GOVERNMENT INTEREST

This invention was developed under Contract DE-AC04-94AL85000 between Sandia Corporation and the U.S. Department of Energy. The U.S. Government has certain rights in the invention.

FIELD OF THE INVENTION

The invention relates to advanced, fire-resistant forms of activated carbon that contain hydrated and/or carbonate-containing minerals (e.g., hydrated magnesium carbonates, hydrated magnesium chloride hydroxides, hydrated magnesium silicates, hydrated calcium and sodium citrates, calcium carbonate, or sodium bicarbonate); and methods of using such advanced activated carbon formulations to adsorb and/or to separate gases in a gas stream.

BACKGROUND OF THE INVENTION

Reprocessing of spent nuclear fuel, e.g. PUREX™ reprocessing, generates nuclear off-gas that contains several radioactive isotopes, including gaseous $^{129}$I and noble gases $^{85}$Kr and $^{133}$Xe. Entrapping noble gas nuclides for permanent disposal is technically challenging because they are chemically inert. Only very aggressive agents, such as fluorine, can form compounds with noble gas nuclides. The half-lives of $^{85}$Kr and $^{133}$Xe are 10.7 years and 5.3 days, respectively. As the half-life of $^{133}$Xe is sufficiently short, the Xe activity would be negligible if the spent fuel were stored for several months before reprocessing. Therefore, the separation and capture of $^{85}$Kr becomes a key issue in trapping radioactive noble gases.

Several methods have been proposed for trapping radioactive noble gas streams from the off-gas. These methods include cryogenic distillation and membrane separation. The cryogenic distillation process is well understood. However, the drawbacks include higher operating cost and the potential for fire hazard because of ozone accumulation. The membrane separation process also has high operating cost and low throughput, or efficiency.

Activated carbon is one known adsorbent, which has a high capacity to adsorb noble gases. In addition, activated carbon is relatively inexpensive in comparison to the cryogenic and membrane separation methods. Activated carbon, however, poses a significant fire hazard. For trapping of noble gases, and particularly trapping of radioactive $^{85}$Kr, an activated carbon adsorbent that does not pose a significant fire hazard would provide economical and efficient permanent disposal or long-term storage options. Such an activated carbon would therefore be desirable.

In addition, activated carbon adsorbents that do not pose a significant fire risk would be desirable in other industries. For instance, in the chemical and petrochemical industries, activated carbon adsorbers are used to control emissions of solvents and other volatile organic compounds (VOC's) from process streams, off-gases and tank ventings. The volatile organic compounds associated with petrochemical industries include, for example and not limited to, benzene, toluene, xylene (o-, p-, m-isomers), petroleum distillate fractions (naphtha), 2-butoxyethanol, and ethyl benzene.

In the fields of environmental engineering, nuclear, military, and specialist extraction, activated carbon is also used to remove VOC's and other chemicals. For example, aliphatic, aromatic, unsaturates and alicyclics hydrocarbons and other pollutants are present in the atmosphere of submarines and are removed by activated carbon beds. Despite their use in these industries, the fire risk posed by the activated carbon is of great concern and there have been a number of fire accidents related to activated carbon ignition. Thus, an advanced, fire-resistant activated carbon material would be desirable in such other industries as well.

SUMMARY OF THE INVENTION

The invention provides advanced, fire-resistant forms of activated carbon having improved fire resistance, methods of making same, and methods of using same to adsorb and/or separate gases.

A first aspect of the invention provides an advanced activated carbon comprising between 5 and 95 wt % of one or more hydrated and/or carbonate-containing mineral wherein the mineral contains between 15 and 16 wt % water and between 95 and 5 wt % activated carbon.

Certain embodiments of the invention provide an advanced activated carbon including between 15 and 40 wt % hydrated magnesite, wherein the hydrated magnesite contains between 15 and 16 wt % water and between 60 and 85 wt % activated carbon.

One specific embodiment of the invention provides an advanced activated carbon including between 22 and 27 wt % hydrated magnesite and between 78 and 73 wt % activated carbon. In another embodiment of the invention, the advanced activated carbon includes between 33 and 35 wt % hydrated magnesite and between 67 and 65 wt % activated carbon.

A second aspect of the invention provides an advanced activated carbon including between 30 and 50 wt % hydrated sepiolite, wherein the hydrated sepiolite contains between 16 and 17 wt % water; and between 70 and 50 wt % activated carbon.

One specific embodiment of the invention provides an advanced activated carbon has between 44 and 46 wt % hydrated sepiolite and between 56 and 54 wt % activated carbon.

A third aspect of the invention provides an advanced activated carbon including between 30 and 45 wt % hydrated nesquehonite, wherein the hydrated nesquehonite contains between 39 and 40 wt % water; and between 70 and 55 wt % activated carbon.

In one embodiment of the invention, the advanced activated carbon has between 44 and 46 wt % hydrated nesquehonite and between 56 and 54 wt % activated carbon. In another embodiment of the invention, the advanced activated carbon has between 38 and 40 wt % hydrated nesquehonite and between 62 and 60 wt % activated carbon.

A fourth aspect of the invention provides an advanced activated carbon including between 45 and 60 wt % hydrated calcium citrate tribasic, wherein the hydrated calcium citrate tribasic contains between 12 and 13 wt % water; and between 55 and 40 wt % activated carbon.

In one embodiment of the invention, the advanced activated carbon has between 53 and 55 wt % hydrated calcium citrate tribasic and between 47 and 45 wt % activated carbon.

In specific embodiments of the invention, the advanced activated carbon has a krypton adsorption rate constant at 25° C. of equal to or greater than 0.35 mg/g min$^{-1}$.

A fifth aspect of the invention provides an advanced activated carbon including between 40 and 70 wt % sodium bicarbonate and between 60 and 30 wt % activated carbon.

A sixth aspect of the invention provides a method of removing a target gas from a gas stream including contacting the gas stream with an advanced activated carbon selected from the group consisting of an advanced activated carbon having between 15 and 40 wt % hydrated magnesite and between 60 and 85 wt % activated carbon; an advanced activated carbon having between 30 and 50 wt % hydrated sepiolite and between 70 and 50 wt % activated carbon; an advanced activated carbon having between 30 and 45 wt % hydrated nesquehonite and between 70 and 55 wt % activated carbon; and an advanced activated carbon having between 45 and 60 wt % hydrated calcium citrate tribasic and between 55 and 40 wt % activated carbon.

In one embodiment of the inventive method the contacting occurs at room temperature.

In another embodiment of the inventive method, structural water and/or $CO_2$ are released from the advanced activated carbon.

In yet another embodiment of the inventive method, the target gas is selected from the group of noble gases, $^{129}I$ gas, volatile organic compounds, and combinations thereof.

Yet another embodiment of the invention provides a method for separating gasses comprising contacting a gaseous mixture with the inventive advanced activated carbon.

Yet another embodiment of the invention provides a method for making the inventive advanced activated carbon by first separately weighing out the desired amounts of the one or more hydrated and/or carbonated containing minerals and activated carbon and then mixing such amounts by mechanical mixing.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF PREFERRED EMBODIMENTS

Figure 1:
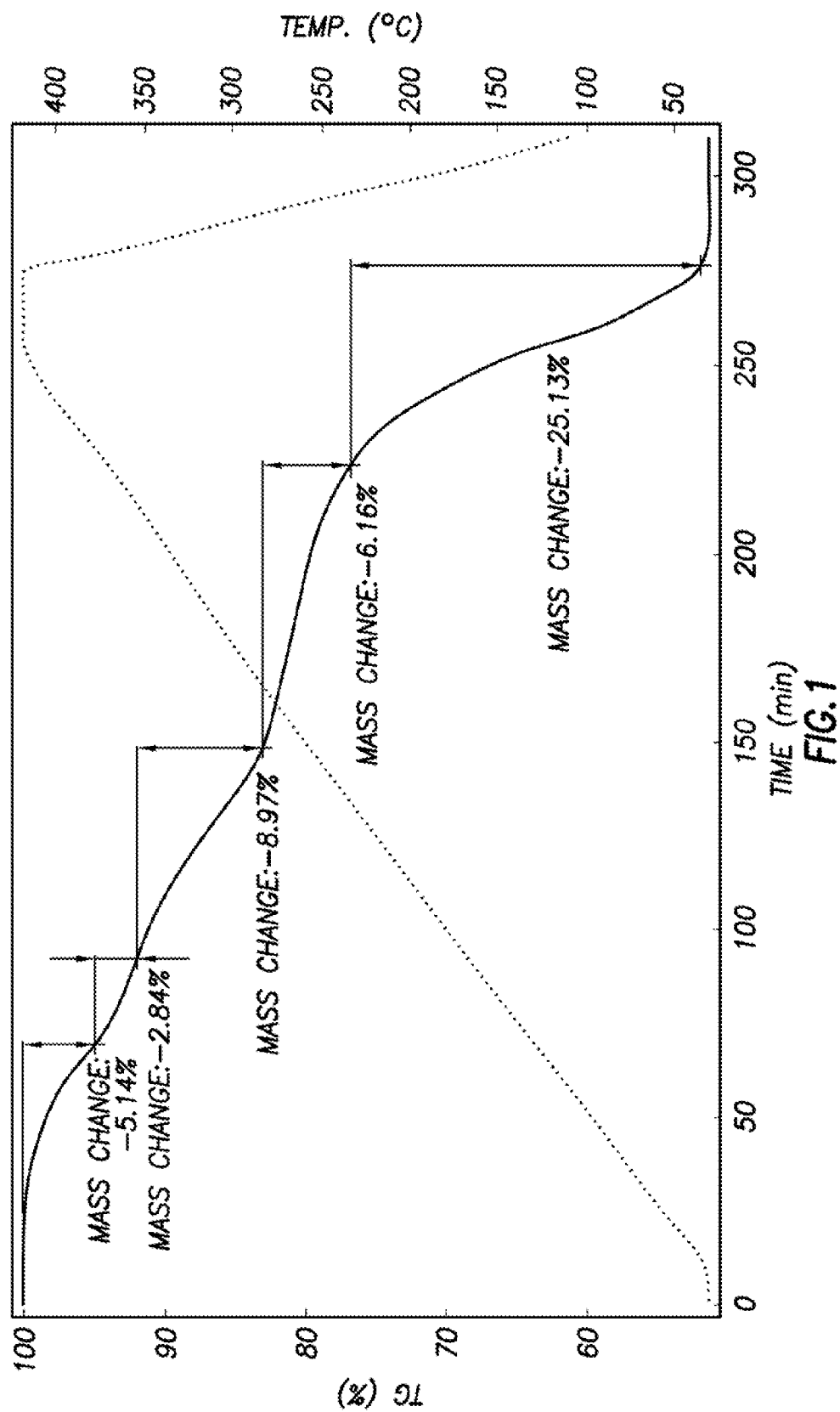
FIG. 1 is graph generated from thermogravimetric analysis of hydromagnesite (e.g., $Mg_5[CO_3]_4[OH]_2.4H_2O$), used to produce Inventive Examples 1 and 2, illustrating the weight loss as a function of time and temperature, wherein the solid line indicates the weight loss and the dotted line shows the temperature ramp profile.

The invention relates to advanced, fire-resistant forms of activated carbon that contain hydrated or carbonated minerals and/or The invention further provides methods of using such advanced activated carbon formulations to adsorb and/or separate gases.

As used herein the terms "hydrated magnesite" and "hydromagnesite" are interchangeable.

The term "one or more hydrated and/or carbonate-containing mineral" as used herein means one or more hydrated minerals, one or more carbonate-containing minerals, or a combination of one or more hydrated minerals and one or more carbonate-containing minerals.

Some advanced forms of activated carbon, according to the invention, comprise a mixture of activated carbon and a fire-suppressing additive or agent. The fire-suppressing additive or agent can be a material that releases water, or carbon dioxide, or both water and carbon dioxide, when heated. The fire-suppressing additive or agent can be mechanically mixed with, combined with, incorporated into, impregnated into, adsorbed onto, and/or bonded or joined to the activated carbon material.

In one embodiment, the ingredients (the activated carbon and the one or more fire-suppressing additives) for making up an advanced activated carbon composition are first manually mixed. Then, the manually-mixed material is loaded into a McCrone Micronising Mill (mixer mill, Glen Creston Limited), and ground to a sub-micron size. This produces a homogeneous mixture (agglomeration) of sub-micron size particles, without any observable phase separation between the activated carbon and fire-suppressing additive(s). Visually, the homogeneous mixture of sub-micron size particles typically appears uniformly black. Some advanced forms of activated carbon according to the invention comprise an activated carbon and a nano-structured hydrated metal carbonate or metal silicate solid phase additive or agent, wherein the hydrated metal carbonate or metal silicate solid is capable of releasing structural water at elevated temperatures (e.g., less than or equal to 500° C.) and can also be capable of producing other endothermic reactions (e.g., up to 900° C.), e.g., carbon dioxide.

The fire-suppressing agents or additives according to the invention may be a hydrated metal carbonate and/or a hydrated metal silicate.

In some embodiments, the advanced activated carbon composition can comprise a mixture of activated carbon and at least one carbon dioxide-evolvable additive, wherein the carbon dioxide-evolvable additive evolves (i.e., releases) carbon dioxide gas when the composition is heated above 300° C. The carbon dioxide-evolvable additive can additionally comprise structural water (e.g., in a hydrated structural form), wherein water vapor is released when the composition is heated above 100° C.

Some examples of carbon dioxide-evolvable additives, according to the invention, include: hydromagnesite, hydrated nesquehonite, hydrated calcium citrate tribasic, sodium citrate dihydrate, magnesium chloride hydroxide hydrate, sodium bicarbonate, and calcium carbonate, and combinations thereof.

In other embodiments, an advanced activated carbon composition can comprise a mixture of activated carbon and at least one water-evolvable additive, wherein the water-evolvable additive evolves (i.e., releases) water vapor when the composition is heated above 100° C. Some examples of water-evolvable additives, according to the invention, include: hydromagnesite, hydrated sepiolite, hydrated nesquehonite, hydrated calcium citrate tribasic, sodium citrate dihydrate, magnesium chloride hydroxide hydrate, and combinations thereof.

In other embodiments, an advanced activated carbon composition can comprise a mixture of activated carbon and at least one water-evolvable and at least one carbon dioxide-evolvable additive, wherein the water vapor evolves when the composition is heated above 100° C. and carbon dioxide gas evolves when the composition is heated above 300° C.

Hydrated metal carbonates useful in some embodiments of the invention may be: hydromagnesite (e.g., $Mg_5[CO_3]_4[OH]_2 \cdot 4H_2O$), hydrated nesquehonite (e.g., $MgCO_3 \cdot 3H_2O$), hydrated calcium citrate tribasic (e.g., $Ca_3(C_6H_5O_7)_2 \cdot 4H_2O$), sodium citrate dihydrate (e.g., $Na_3(C_6H_5O_7) \cdot 2H_2O$), magnesium chloride hydroxide hydrate (e.g., $Mg_3(OH)_5Cl \cdot 4H_2O$) or (e.g., $Mg_2(OH)_3Cl \cdot 4H_2O$), or any combination thereof.

Hydrated metal silicates useful in some embodiments of the invention may be, for example, hydrated sepiolite (e.g., $Mg_4Si_6O_{15}(OH)_2 \cdot 6H_2O$).

The fire-suppressing agents or additives according to the invention may comprise carbonates, such as calcium carbonate or sodium bicarbonate, and combinations thereof.

Activated carbons useful in embodiments of the invention include, without limitation, commercially-available activated carbon, for example, activated carbon available from Alfar Aesar™.

The chemical formulas shown in Table 1, and elsewhere, show specific examples of a specific amount (i.e., degree) of hydration. For example, an example of the formula for hydromagnesite is shown as "$Mg_5[CO_3]_4[OH]_2 \cdot 4H_2O$" in Inventive Example 1. However, in real minerals, the degree of hydration is variable, depending on the processing conditions, amount of impurities, etc. Therefore, when we state a particular mineral (e.g., hydromagnesite), we define that term to include a realistic range in the degree (amount) of hydration. For example, we define the term "hydromagnesite" to include a range in hydration states, $(Mg_5[CO_3]_4[OH]_2 \cdot NH_2O)$, where N can range from 0.5 to 11. In other words, the term "hydromagnesite" is broadly defined herein to include similar phases and their solid solutions with other degrees of hydration than just N=4.

Other examples of suitable hydrated carbonate-containing minerals, which can be combined with activated carbon to make an advanced activated carbon composition according to the present invention, include: dypingite (e.g., $Mg_5[CO_3]_4[OH]_2 \cdot 5H_2O$), giorgiosite (e.g., $Mg_5[CO_3]_4[OH]_2 \cdot 5H_2O$), widgiemoolthalite (e.g., $[Ni, Mg]_5[CO_3]_4[OH]_2 \cdot 4.5H_2O$), pokrovskite (e.g., $Mg_2[CO_3][OH]_2 \cdot 0.5 H_2O$), coalingite (e.g., $Mg_{10}Fe_2[CO_3][OH]_{24} \cdot 2H_2O$), brugnatellite (e.g., $Mg_6Fe[CO_3][OH]_{13} \cdot 4H_2O$), artinite (e.g., $Mg_2[CO_3][OH]_2 \cdot 3H_2O$), hydrotalcite (e.g., $Mg_6Al_2[CO_3][OH]_{16} \cdot 4H_2O$), manasseite (e.g., $Mg_6Al_2[CO_3][OH]_{16} \cdot 4H_2O$), chlorartinite (e.g., $Mg_2[CO_3]Cl[OH] \cdot 3H_2O$), barbertonite (e.g., $Mg_6Cr_2[CO_3][OH]_{16} \cdot 4H_2O$), stichtite (e.g., $Mg6Cr_2[CO_3][OH]_{16} \cdot 4H_2O$), desautelsite (e.g., $Mg_6Mn_2[CO_3][OH]_{16} \cdot 4H_2O$), pyroaurite (e.g., $Mg_6Fe_2[CO_3][OH]_{16} \cdot 4H_2O$), sjogrenite (e.g., $Mg_6Fe_2[CO_3][OH]_{16} \cdot 4H_2O$), sergeevite (e.g., $Mg_{11}Ca_2[CO_3]_9[HCO_3]_4[OH]_4 \cdot 6H_2O$), mountkeithite (e.g., $[Mg, Ni]_{11}[Fe, Cr]_3[SO4, CO_3]_{3.5}[OH]_{24} \cdot 11H_2O$), and baylissite (e.g., $K_2Mg[CO_3]_2 \cdot 4H_2O$), and combinations thereof.

In some embodiments of the invention the hydrated magnesite (hydromagnesite) is present in the advanced activated carbon in an amount in the range of 15 to 40 wt %, alternatively between 20 and 36 wt %, alternatively between 22 and 30 wt %, alternatively between 30 and 37 wt %, or alternatively between 33 and 35 wt %.

In some embodiments of the invention the hydrated nesquehonite is present in the advanced activated carbon in an amount in the range of 30 to 50 wt %, alternatively between 35 and 48 wt %, alternatively between 38 and 40 wt %, alternatively between 40 and 46 wt %, or alternatively between 44 and 46 wt %.

Figure 5:
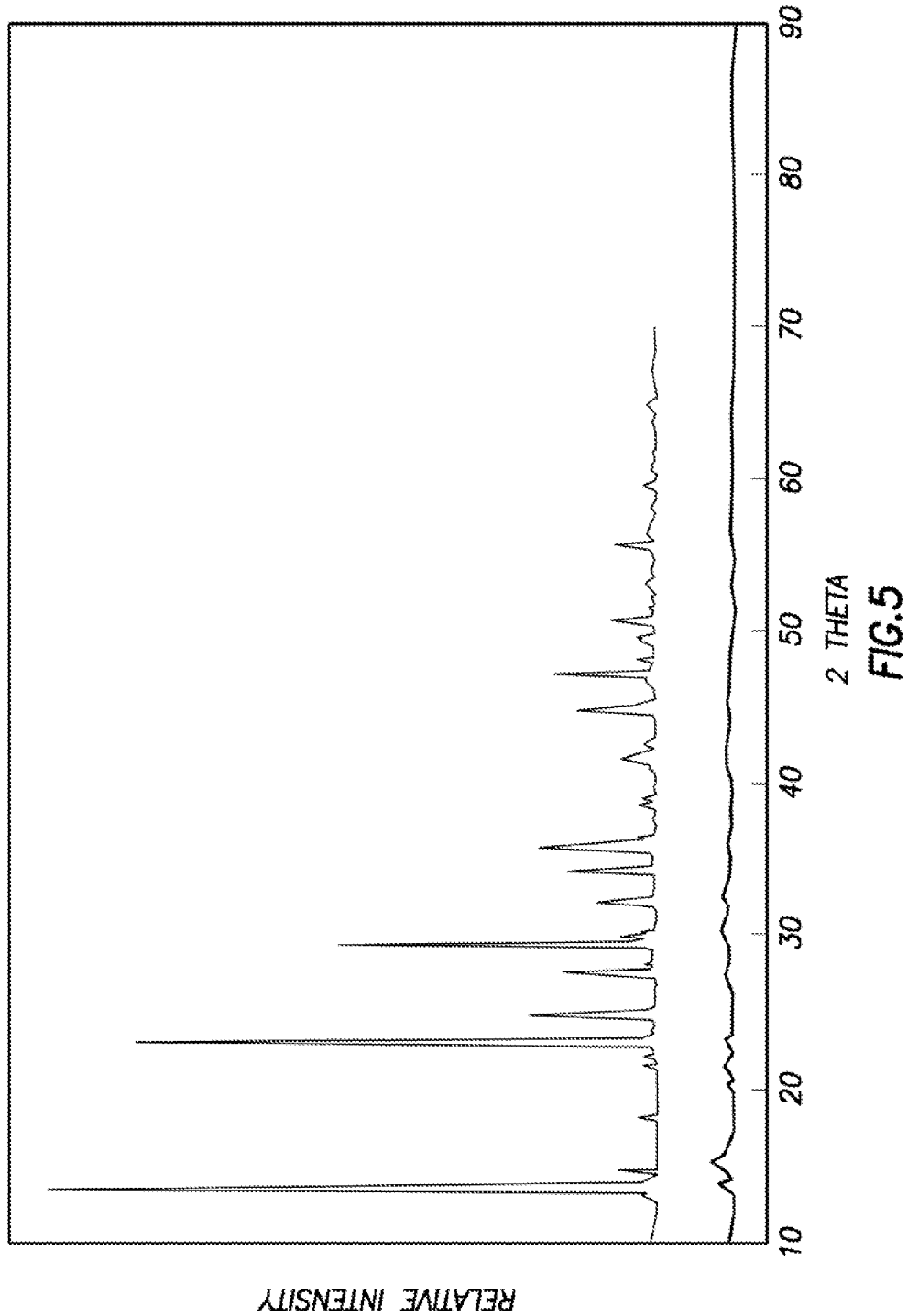
FIG. 5 is a graph illustrating the XRD results of hydrated magnesite and nesquehonite used in the Examples herein.

Hydromagnesite can be synthesized by first mixing a 1.0 M $Na_2CO_3$ solution with a 1 M $MgCl_2$ solution at 21° C. Then, after one day, the precipitates were filtered out with vacuum filtration. The filtered material was then dried at 60° C. for one day. In a similar fashion, hydrated nesquehonite can be synthesized by first mixing a 1.4 M $NH_4HCO_3$ solution with a 2.0 M $MgCl_2$ solution at 50° C. on a hot plate with stirring for 2 hours. Then, the solution was put on a lab bench at 21° C. for two days. The precipitates were then filtered out with vacuum filtration. The filtered precipitates were dried at 21° C. for one day. The synthesized hydromagnesite and nesquehonite have well-defined XRD patterns, as shown in FIG. 5. The top curve in FIG. 5 is for nesquehonite and the bottom curve is for hydromagnesite.

The final composition, especially for the mixing product produced during the synthesizing hydromagnesite in the presence of activated carbon, can be described as an agglomerate or agglomeration.

In another embodiment of a method of making the inventive compositions, the method steps can comprise the following. First, 100 mL of 1 M $Na_2CO_3$ was prepared and placed into a beaker with a stir bar. Then, desired amounts of activated carbon were put into the beaker to make a slurry. After that, 100 mL of 1 m $MgCl_2$ solution was added into the beaker, and hydromagnesite started to precipitate. The stir bar continuously stirred the solution/slurry for the entire period of synthesis. Then, the solids are filtered out from the liquid, and the solids dried. Finally, the solids are mechanically ground/milled to a sub-micron size, which produces the final advanced activated carbon composition. In this embodiment, the activated carbon is added to the beaker before the hydromagnesite is precipitated out. In this case, we call this process as a "chemical precipitation mixing" method. In contrast, if this activated carbon was added to the beaker after the hydromagnesite had been precipitated out, then we would call that process a simple "mechanical mixing" process.

A preferred process is to add the activated carbon to the beaker before the $MgCl_2$ solution is added into the beaker to precipitate hydromagnesite (or other hydrated mineral).

The chemical precipitation mixing method described above can be used to prepare any of the inventive examples and embodiments listed in Table 1, as well as for any of the other hydrated and/or carbonate minerals listed in this application.

In some embodiments of the invention the hydrated sepiolite is present in the advanced activated carbon in an amount in the range of 30 to 50 wt %, alternatively between 35 and 48 wt %, alternatively between 40 and 47 wt %, or alternatively between 44 and 46 wt %.

In some embodiments of the invention the hydrated calcium citrate tribasic is present in the advanced activated carbon in an amount in the range of 45 to 60 wt %, alternatively between 48 and 58 wt %, alternatively between 50 and 56 wt %, or alternatively between 53 and 55 wt %.

In some embodiments of the invention the sodium bicarbonate is present in the advanced activated carbon in an amount in the range of 40 to 75 wt %, alternatively between 45 and 70 wt %, or alternatively between 48 and 68 wt %.

Some advanced activated carbons of the invention can have a Krypton adsorption rate constant at 25° C. of equal to or greater than 0.35 mg/g min$^{-1}$, alternatively greater than 0.48 mg/g min$^{-1}$, alternatively greater than 0.65 mg/g min$^{-1}$, or alternatively greater than 0.73 mg/g min$^{-1}$.

The method of removing a target gas from a gas stream of the invention comprises contacting the gas stream with one or more of the advanced activated carbon described herein. By way of example but not by way of limitation, such advanced activated carbon may be selected from the group consisting of an advanced activated carbon comprising between 15 and 40 wt % hydrated magnesite; an advanced activated carbon comprising between 30 and 50 wt % hydrated sepiolite; an advanced activated carbon comprising between 30 and 45 wt % hydrated nesquehonite; an advanced activated carbon comprising between 45 and 60 wt % hydrated calcium citrate tribasic; an advanced activated carbon comprising between 40 and 70 wt % sodium bicarbonate, and any combination thereof.

In some embodiments of the inventive method, the contacting with a gas stream occurs at a temperatures between room temperature and a measured ignition temperature, alternatively between 15 and 30° C., alternatively between 20 and 27° C., alternatively between 25 and 250° C., alternatively between 20 and 200° C., or alternatively between 50 and 150° C.

In some embodiments of the inventive method, structural water and/or $CO_2$ are released from the advanced activated carbon when heated.

In some embodiments, the hydrated magnesium carbonate is hydrated nesquehonite, and up to 40 wt % water based on the total weight of the hydrated nesquehonite is released during the contacting; alternatively, up to 30 wt % water is released; alternatively up to 35 wt % water is released.

In some embodiments, the hydrated magnesium carbonate is hydromagnesite and up to 16 wt % water based on the total weight of the hydromagnesite is released during the contacting; alternatively, up to 15 wt % water is released; alternatively up to 13 wt % water is released.

In some embodiments, the hydrated magnesium silicate is hydrated sepiolite and up to 18 wt % water based on the total weight of the hydrated sepiolite is released during the contacting; alternatively, up to 17 wt % water is released; alternatively up to 15 wt % water is released.

In some embodiments, the advanced activated carbon comprises hydrated calcium citrate tribasic and up to 13 wt % water based on the total weight of the hydrated calcium citrate tribasic is released during the contacting; alternatively, up to 12 wt % water is released; alternatively up to 10 wt % water is released.

In some embodiments of the inventive method, the target gas is selected from the group of noble gases, $^{128}$I gas, volatile organic compounds, and combinations thereof.

Without being bound by any particular theory, it is believed that the inventive advanced forms of activated carbon substantially decrease or eliminate the risk of fire due to the ability to release structural water when heated. As the ignition temperature of standard activated carbon is 250° C. (and exothermic oxidative reactions of activated carbon occur at temperature as low as 200° C.) the advanced forms of activated carbon contain fire-suppressing agents or additives that can release structural water well below 200° C. (the exothermic oxidative reaction temperature of activated carbon) if they are heated during adsorption or separation processes, or during material storage. The released water then can capture heat released, because water has a large heat capacity, thereby preventing the temperature from reaching the temperature required for the oxidative reactions of the activated carbon. At higher temperatures, the inert gas $CO_2$ is released, which acts as a diluent to lower the partial pressure of oxygen in the surrounding environment; acting further to suppress the process of tire ignition and burning.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application.

The above description and examples that follow illustrate, but do not limit, various aspects or embodiments of this invention.

EXAMPLES

Methods and Materials

Each of the advanced activated carbons of embodiments of the invention were prepared by first separately weighing out the desired masses of the one or more hydrated and/or carbonated containing minerals and activated carbon and then mixing such amounts by mechanical mixing (e.g., by using a mortar and pestle to grind the ingredients by hand).

Gas adsorption measurements were made gravimetrically using the vacuum microbalance in a Netzsch STA 409 thermal gravimetric analyzer (TGA) with differential scanning calorimeter (DSC) and Differential Thermal Analyzer (DTA). The masses of each advanced activated carbon sample were first measured with a Mettler Toledo AT 261 Delta Range balance with a precision to 0.0001 g (0.1 mg). The advanced activated carbon sample mass was usually about 100 mg. The advanced activated carbon sample was then loaded into a small crucible in the TGA, the system purged to vacuum, followed by a backfill of a noble gas to the desired pressure. Specifically, the advanced activated carbon samples were analyzed for adsorption of Ar and Kr gases, each at 0.2 to 0.9 atmospheric pressures. The advanced activated carbon samples were then analyzed to determine the amount of noble gas adsorption by using an automated time/temperature profile. The time/temperature profile was as follows: (1) heating to 90° C.; (2) maintaining at 90° C. for two hours (desorption step) in which desorbed gas was purged out of the system via an exhaust tube; (3) cooling to room temperature with noble gas being backfilled; and (4) maintaining at room temperature for two hours (adsorption step). The amount of adsorbed noble gas on an advanced activated carbon sample was determined by the weight difference between an activated carbon sample analysis from an instrumental blank. The instrumental blank was made by employing the same, but empty crucible, which was used for the activated carbon sample analyses. The time/temperature profile for the instrumental blank and a sample analysis were the same. The amounts of absorbed noble gas are calculated based on the mass of noble gas absorbed in the adsorption step, as the desorption step serves as a zero background. The TGA was subjected to the same time/temperature profile and the weight gain subtracted from the instrumental blank in order to eliminate any effect of weight gain by the TGA itself.

The advanced activated carbon compositions were characterized using X-ray diffractometer ("XRD") (Burker D8 Advance).

Table 1 provides the chemical composition of Inventive Examples 1-6. Table 2 provides the chemical composition of Comparative Examples 1-2.

TABLE 1

| Materials | Weight percentage of additives (wt. % variations based on multiple samples) | Weight percentage of Activated Carbon |
|---|---|---|
| Inventive Example 1 | 22.03-26.37 of hydromagnesite (e.g., $Mg_5[CO_3]_4[OH]_2 \cdot 4H_2O$) | Balance |

TABLE 1-continued

| Materials | Weight percentage of additives (wt. % variations based on multiple samples) | Weight percentage of Activated Carbon |
|---|---|---|
| Inventive Example 2 | 33.21-34.38 of hydromagnesite [e.g., $Mg_5[CO_3]_4[OH]_2 \cdot 4H_2O$) | Balance |
| Inventive Example 3 | 44.1-45.7 of hydrated sepiolite [e.g., $Mg_4Si_6O_{15}(OH)_2 \cdot 6H_2O$] | Balance |
| Inventive Example 4 | 45.0 of hydrated nesquehonite (e.g., $MgCO_3 \cdot 3H_2O$) | Balance |
| Inventive Example 5 | 38.8-39.59 of hydrated nesquehonite (e.g., $MgCO_3 \cdot 3H_2O$) | Balance |
| Inventive Example 6 | 54.0 of hydrated calcium citrate tribasic [e.g., $Ca_3(C_6H_5O_7)_2 \cdot 4H_2O$] | Balance |
| Inventive Example 7 | 66.0 of sodium bicarbonate [$NaHCO_3$] | Balance |
| Inventive Example 8 | 49.1 of sodium bicarbonate [$NaHCO_3$] | Balance |
| Inventive Example 9 | 48.5 of calcium carbonate [$CaCO_3$] | Balance |
| Inventive Example 10 | 51.0 of sodium citrate dihydrate [e.g., $Na_3(C_6H_5O_7) \cdot 2H_2O$] | Balance |
| Inventive Example 11 | 47.2 of sodium bicarbonate [$Na_3HCO_3$] | Balance |
| Inventive Example 12 | 49.2 of hydrated magnesium chloride hydroxide hydrate [e.g., $Mg_3(OH)_5Cl \cdot 2H_2O$] | Balance |

TABLE 2

| | Composition |
|---|---|
| Comparative Example 1 | $NH_4$-Mordenite ("Mordenite-N") |
| Comparative Example 2 | Na-Mordenite ("Mordenite-A") |

Figure 2:
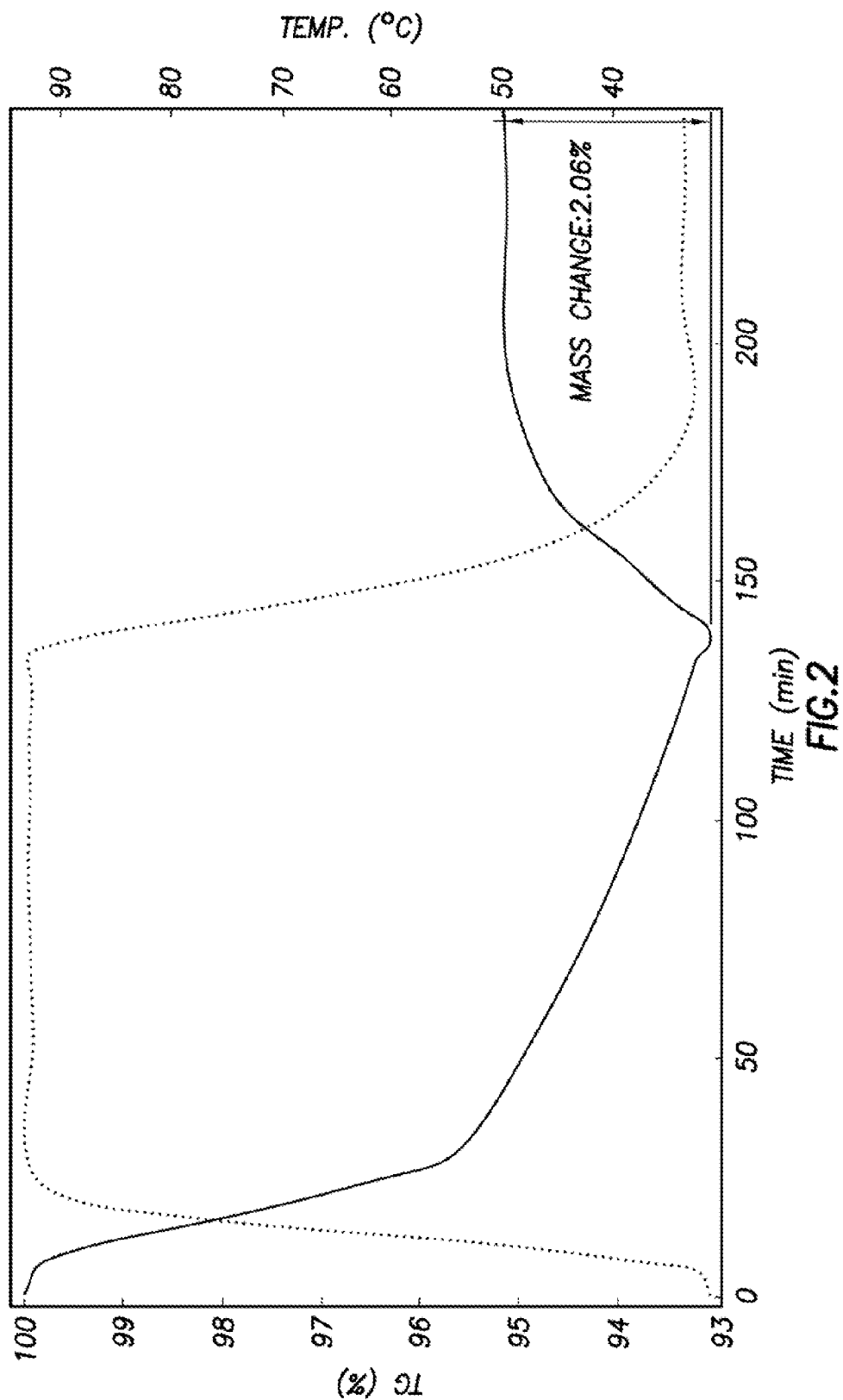
FIG. 2 illustrates the adsorption curve of Kr at 680 torrs onto Inventive Example 6 in which TG means thermal gravimetric and Temp means temperature and wherein the solid line indicates the weight loss and the dotted line shows the temperature ramp profile.

FIG. 2 illustrates the adsorption curve of Kr at 680 torrs onto Inventive Example 6 in which TG means thermal gravimetric and Temp means temperature and wherein the solid line indicates the weight loss and the dotted line shows the temperature ramp profile.

Figure 3:
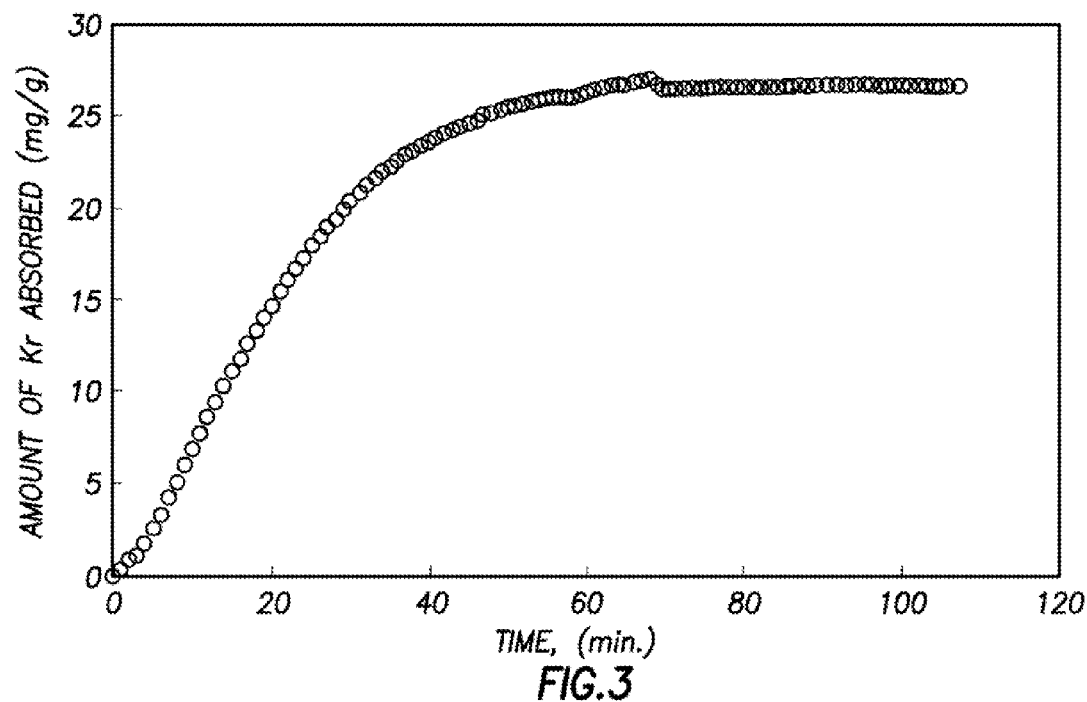
FIG. 3 is a graph illustrating the amount of Kr adsorbed onto Inventive Example 5 (mg Kr/g Inventive Example 5) at room temperature as a function of time.

FIG. 3 is a graph illustrating the amount of Kr adsorbed onto Inventive Example 5 (mg Kr/g Inventive Example 5) at room temperature as a function of time.

Table 3 provides the results of analyses of adsorption amounts of Ar and Kr gases on each of the Inventive and Comparative Examples and commercial activated carbon. It is clear that the gas adsorption capacities of the inventive advanced forms of activated carbon are comparable to those of commercially-available activated carbon; and are superior to those of Na-mordenite and to $NH_4$-mordenite.

TABLE 3

| Sample | Ar adsorbed, wt % | Kr adsorbed, wt % | Wt % of solid phase additive containing structural water in the advanced forms of activated carbon |
|---|---|---|---|
| Inventive Example 1 | 0.42 ± 0.06 | 3.01 | 22.0 (Kr experiment); 26.4 (Ar experiment) |
| Inventive Example 2 | 0.37 ± 0.01 | 2.51 | 33.2 (Kr experiment); 33.9 (Ar experiment) |
| Inventive Example 3 | — | 2.56 | 44.1 |
| Inventive Example 4 | — | 1.63 | 45.0 |
| Inventive Example 5 | — | 2.69 | 38.8 |

TABLE 3-continued

| Sample | Ar adsorbed, wt % | Kr adsorbed, wt % | Wt % of solid phase additive containing structural water in the advanced forms of activated carbon |
|---|---|---|---|
| Inventive Example 6 | — | 2.06 | 54.0 |
| DARCO activated carbon | 0.72 | 3.60 | N/A |
| Alfa Aesar activated carbon | 0.50 | Not Tested | N/A |
| Comparative Example 1 | 0.27 | 1.74 | N/A |
| Comparative Example 2 | 0.12 | 1.31 | N/A |

Table 4 provides the weight percentage of structural water released from the hydrated solid phase additives as a function of temperature. Notice that the hydromagnesite and hydrated nesquehonite additives release more than 15 wt % of structural water below 300° C. In addition, these two agents release $CO_2$ above 350° C. (see, e.g., FIG. 1). Notice also that the total amount of water released measured experimentally agrees well with the theoretical water content in 3 out of the 4 additives tested in Table 4.

TABLE 4

| Additive | Theoretical water contents, wt % | Water released (in wt %) as a function of temperature below 300° C. | Used in: |
|---|---|---|---|
| hydromagnesite (e.g., $Mg_5[CO_3]_4[OH]_2 \cdot 4H_2O$) | 15.4 | 5.14 (125° C.), 2.84 (125° C.-160° C.), 8.97 (160° C.-250° C.) Total released = 16.95 wt % | Inventive Examples 1 and 2 |
| hydrated sepiolite [e.g., $Mg_4Si_6O_{15}(OH)_2 \cdot 6H_2O$] | 16.7 | 2.34 (130° C.), 0.95 (130° C.-250° C.) Total released = 3.29 wt % | Inventive Example 3 |
| hydrated nesquehonite (e.g., $MgCO_3 \cdot 3H_2O$) | 39.1 | 17.98 (150° C.), 10.47 (150° C.-175° C.), 6.12 (175° C.-225° C.) Total released = 34.57 wt % | Inventive Examples 4 and 5 |
| hydrated calcium citrate tribasic [e.g., $Ca_3(C_6H_5O_7)_2 \cdot 4H_2O$] | 12.6 | 3.07 (105° C.), 7.79 (105° C.-172° C.) Total released = 10.86 wt % | Inventive Example 6 |

FIG. 1 is graph generated from thermogravimetric analysis of hydromagnesite (e.g., $Mg_5[CO_3]_4[OH]_2 \cdot 4H_2O$), used to produce Inventive Examples 1 and 2, illustrating the weight loss as a function of time and temperature up to 400° C., wherein the solid line indicates the weight loss and the dotted line shows the temperature ramp profile. The theoretical structural water ($H_2O$) content in the solid sample is 15.4 wt %. Upon heating, 5.14 wt % of water is released at 125° C. Then, 2.84 wt % is released between 125° C. and 160° C. Finally, 8.97 wt % of water is released between 160° C. and 250° C. In the temperature range from 250° C. to about 350° C., water contained in hydroxyl groups (i.e., OH) is released. At temperatures higher than 350° C., 25.1 wt % of $CO_2$ is released.

Figure 4:
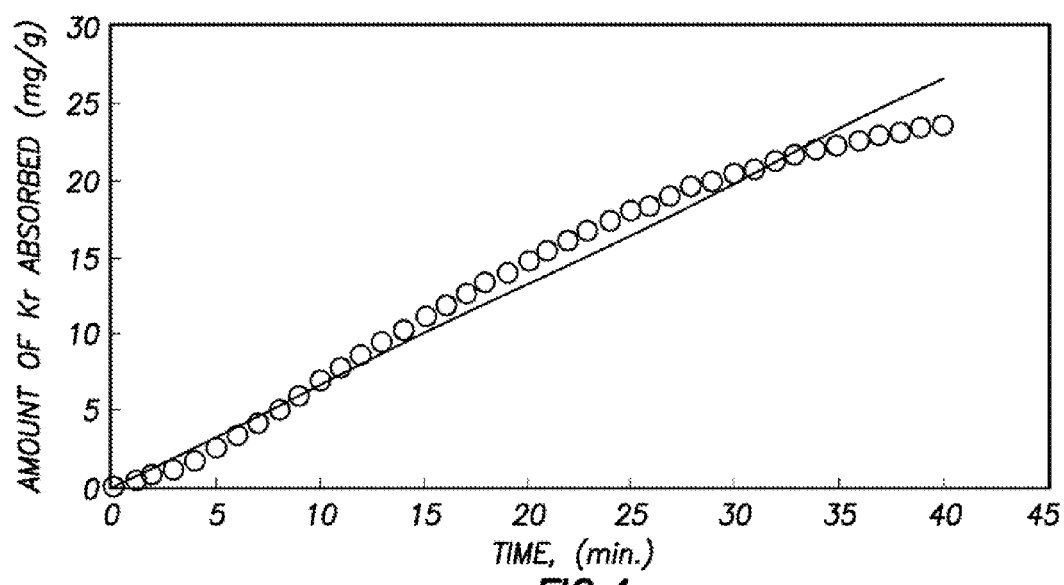
FIG. 4 is a graph illustrating the amount of Kr adsorbed onto Inventive Example 5 (mg Kr/g Inventive Example 5) at room temperature as a linear function of time, from which the rate constant can be obtained from the slope, wherein the solid line is a fitted linear function and the open circles represent experimentally measured points.

FIG. 4 is a graph illustrating the amount of Kr adsorbed onto Inventive Example 5 (mg Kr/g Inventive Example 5) at room temperature as a linear function of time, from which the rate constant can be obtained from the slope, wherein the solid line is a fitted linear function and the open circles represent experimentally measured points. The initial linear portion of adsorption curves is used to obtain adsorption rate constants, as illustrated in FIGS. 3 and 4.

Table 5 provides the gas adsorption rate constants at 680 torr and 25° C. for each of the Inventive and Comparative Examples and DARCO activated carbon. The results in Table 5 indicate that the inventive advanced forms of fire-resistant activated carbon have gas adsorption rate constants higher than those of both the Na-mordenite and to $NH_4$-mordenites (which have been considered for adsorption of radioactive noble gases, and are comparable to those of activated carbon).

TABLE 5

| Material | Noble gas adsorbed | Adsorption rate constant ($k_{Ar}$ or $k_{Kr}$), mg/g min$^{-1}$ |
|---|---|---|
| Mordenite-A (Ca, $Na_2$, $K_2)Al_2Si_{10}O_{24} \cdot 7H_2O$ | Argon | $4.10 \times 10^{-2}$ |
| Mordenite-A $k_{Kr}/k_{Ar}$ | Krypton | $2.53 \times 10^{-1}$ 6.17 |
| Mordenite-N (Ca, $Na_2$, $K_2)Al_2Si_{10}O_{24} \cdot 7H_2O$ | Argon | $8.84 \times 10^{-2}$ |
| Mordenite-N $k_{Kr}/k_{Ar}$ | Krypton | $5.00 \times 10^{-1}$ 5.66 |
| Inventive Ex. 1 | Argon | $2.59 \times 10^{-1}$ |
| Inventive Ex. 1 | Krypton | $7.46 \times 10^{-1}$ |
| Inventive Ex. 1 $k_{Kr}/k_{Ar}$ | | 2.88 |
| Inventive Ex. 2 | Argon | $1.52 \times 10^{-1}$ |
| Inventive Ex. 2 | Krypton | $6.67 \times 10^{-1}$ |
| Inventive Ex. 2 $k_{Kr}/k_{Ar}$ | | 4.39 |
| Inventive Ex. 3 | Krypton | $6.41 \times 10^{-1}$ |
| Inventive Ex. 4 | Krypton | $3.86 \times 10^{-1}$ |
| Inventive Ex. 5 | Argon | $8.13 \times 10^{-2}$ |
| Inventive Ex. 5 | Krypton | $6.62 \times 10^{-1}$ |
| Inventive Ex. 5 $k_{Kr}/k_{Ar}$ | | 8.14 |
| Inventive Ex. 6 | Krypton | $4.94 \times 10^{-1}$ |
| DARCO activated carbon | Argon | $3.66 \times 10^{-1}$ |
| DARCO activated carbon | Krypton | $9.95 \times 10^{-1}$ |
| DARCO activated carbon $k_{Kr}/k_{Ar}$ | | 2.72 |

The $K_{Kr}/K_{Ar}$ gas adsorption selectivity ratio is defined as the ratio of the gas adsorption rate constant for krypton divided by the gas adsorption rate constant for argon. In particular, Inventive Example 5 has a $K_{Kr}/K_{Ar}$ gas adsorption selectivity ratio greater than 8.

Flammability tests were also performed as described herein. Activated carbon was obtained from Alfar Aesar ("AAAC") and was used to prepare all Inventive and Comparative Examples. All flammability tests were performed in air at a flow rate of 60 cubic centimeter per minute (60 cm$^3$/min) with a heating rate of 20° C./min up to 1200° C. Flammability tests are focused on determination of spontaneous ignition temperatures (SIT). The SITs are graphically determined based on the differential scanning calorimetry (DSC) curves or thermogravimetric analysis (TGA) curves, as discussed below and in "Characterizing the ignition process of activated carbon" by Y. Suzin, et al, Carbon, vol. 37, pp. 335-346 (1999).

Figure 6:
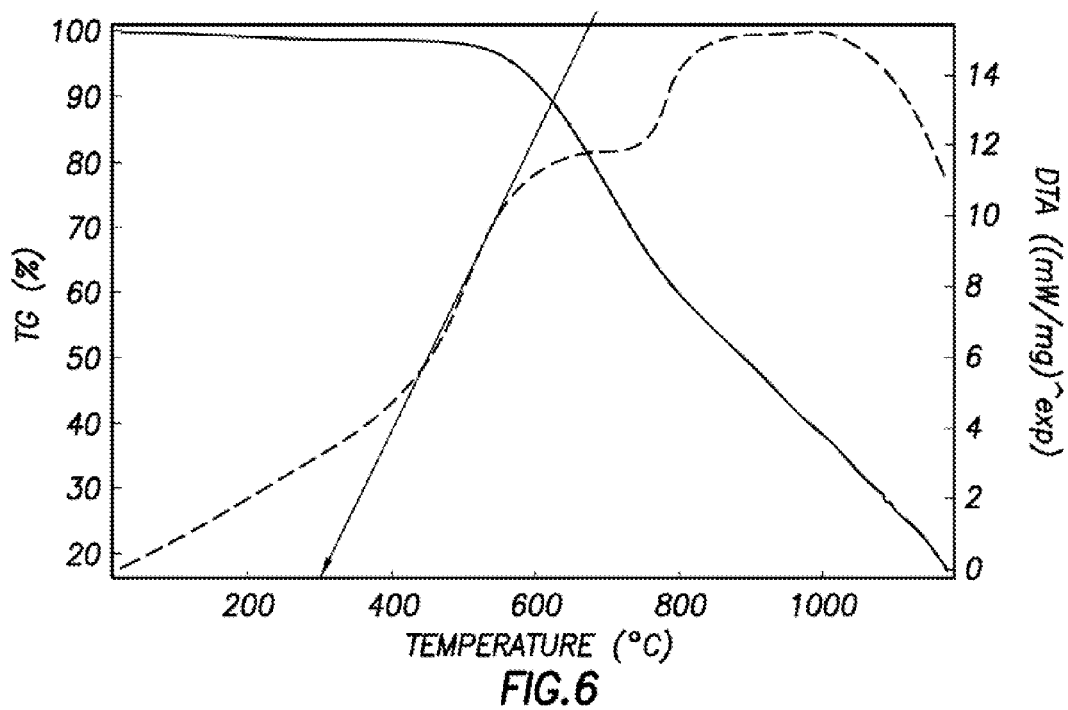
FIG. 6 illustrates the DTA and TGA results for AAAC where the heavy solid line indicates the TGA curve, the heavy broken line indicates the DTA curve, and the arrowed line indicates the spontaneous ignition temperature.
Figure 7:
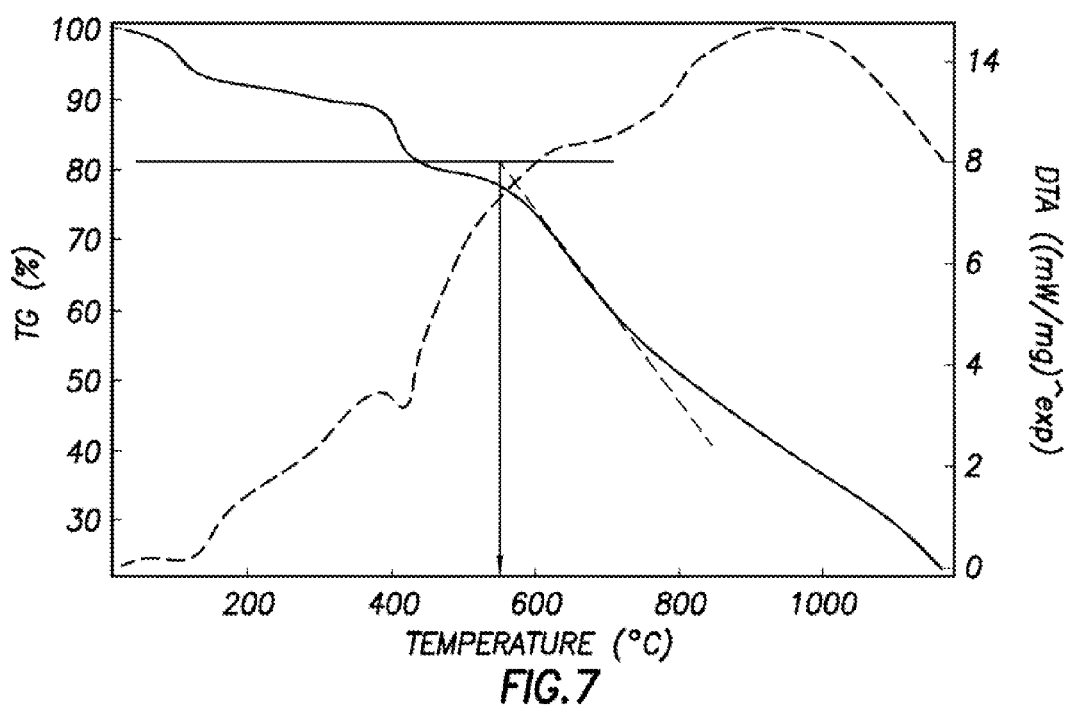
FIG. 7 illustrates the DTA and TGA results for Inventive Example 1 where the heavy solid line indicates the TGA curve, the heavy broken line indicates the DTA curve, and the arrowed line indicates the spontaneous ignition temperature.
Figure 8:
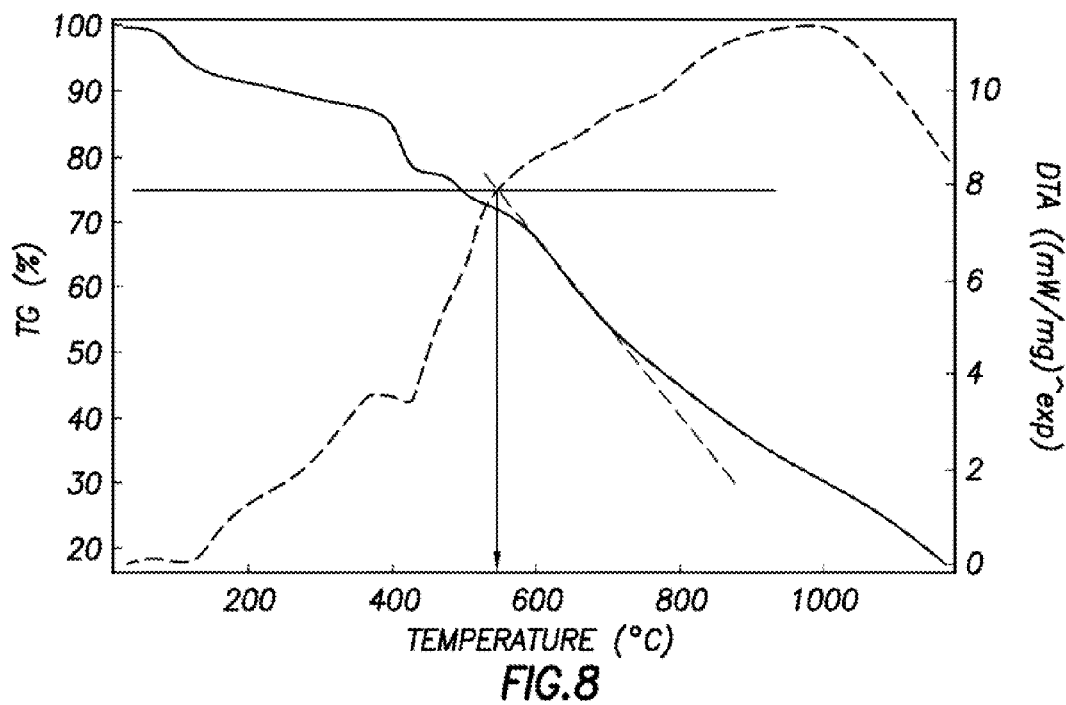
FIG. 8 illustrates the DTA and TGA results for Inventive Example 2 where the heavy solid line indicates the TGA curve, the heavy broken line indicates the DTA curve, and the arrowed line indicates the spontaneous ignition temperature.
Figure 9:
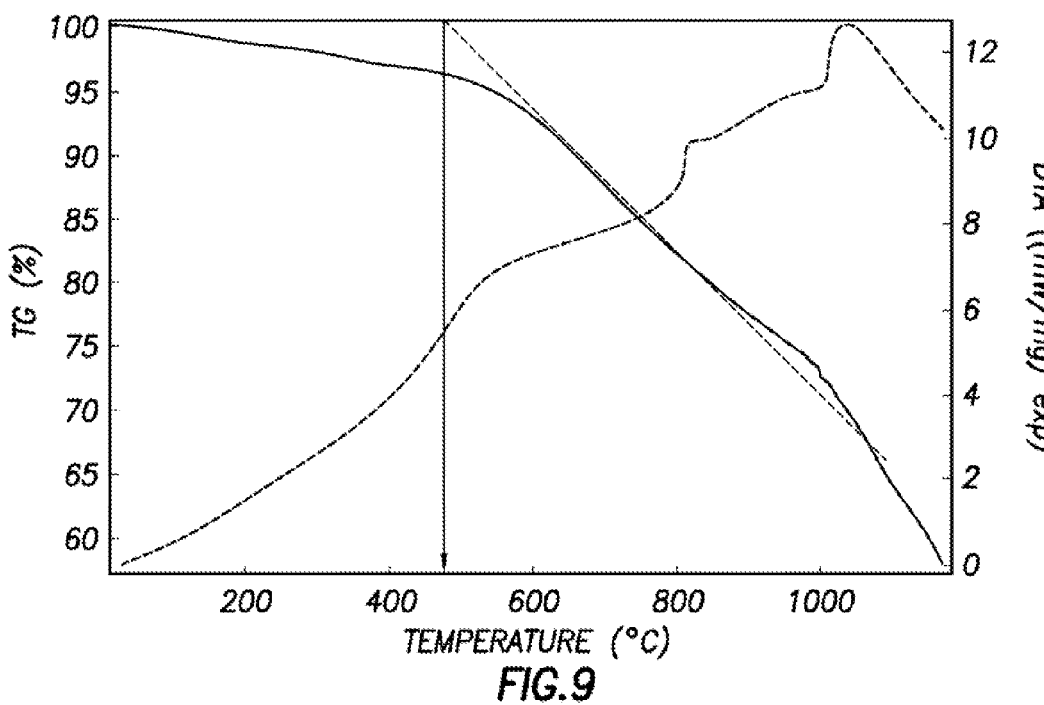
FIG. 9 illustrates the DTA and TGA results for Inventive Example 3 where the heavy solid line indicates the TGA curve, the heavy broken line indicates the DTA curve, and the arrowed line indicates the spontaneous ignition temperature.
Figure 10:
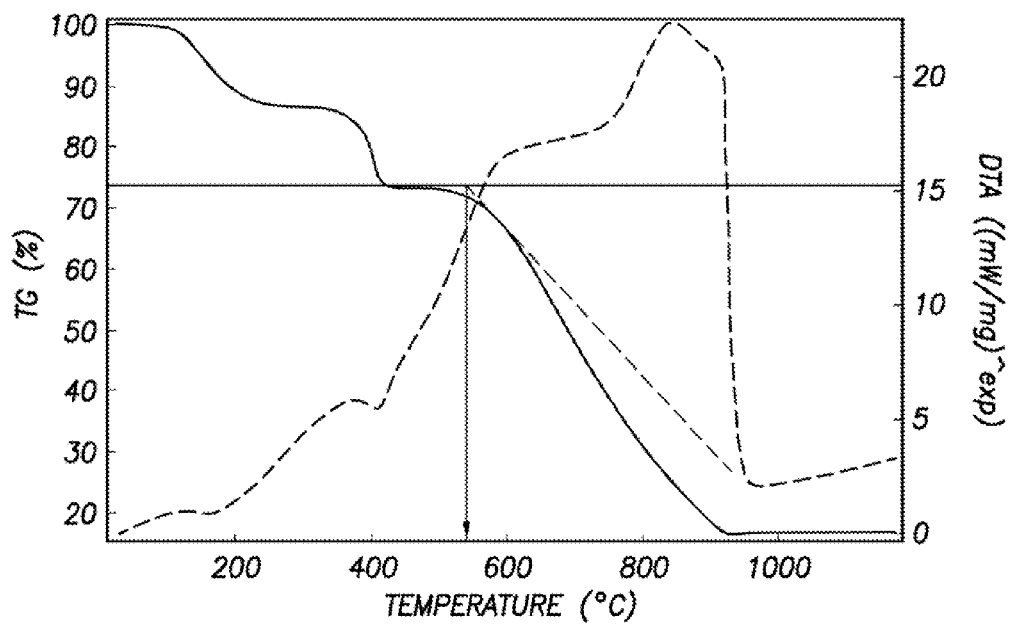
FIG. 10 illustrates the DTA and TGA results for Inventive Example 4 where the heavy solid line indicates the TGA curve, the heavy broken line indicates the DTA curve, and the arrowed line indicates the spontaneous ignition temperature.
Figure 11:
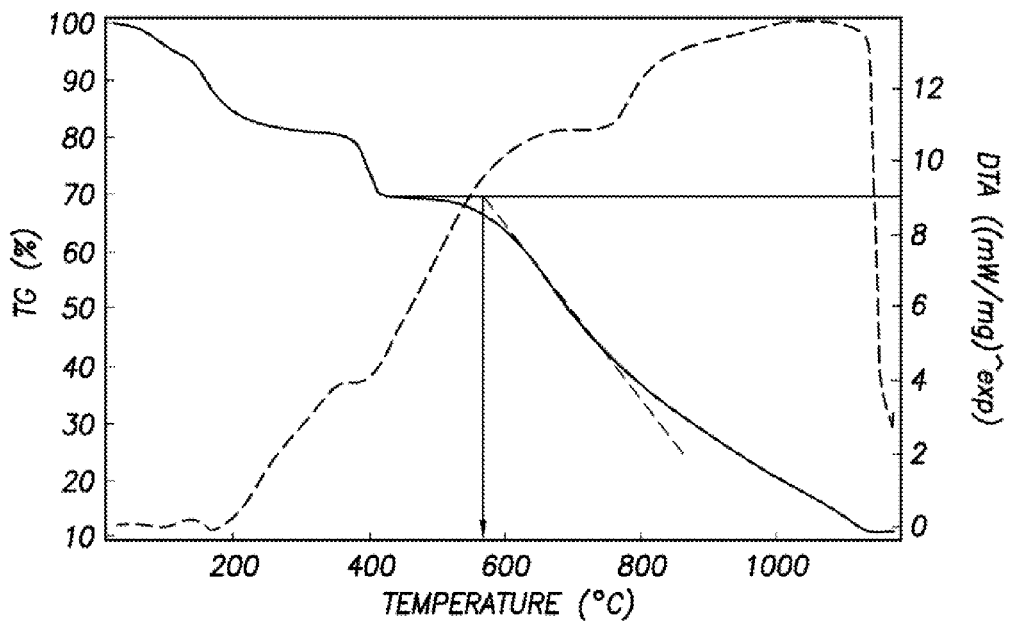
FIG. 11 illustrates the DTA and TGA results for Inventive Example 5 where the heavy solid line indicates the TGA curve, the heavy broken line indicates the DTA curve, and the arrowed line indicates the spontaneous ignition temperature.
Figure 12:
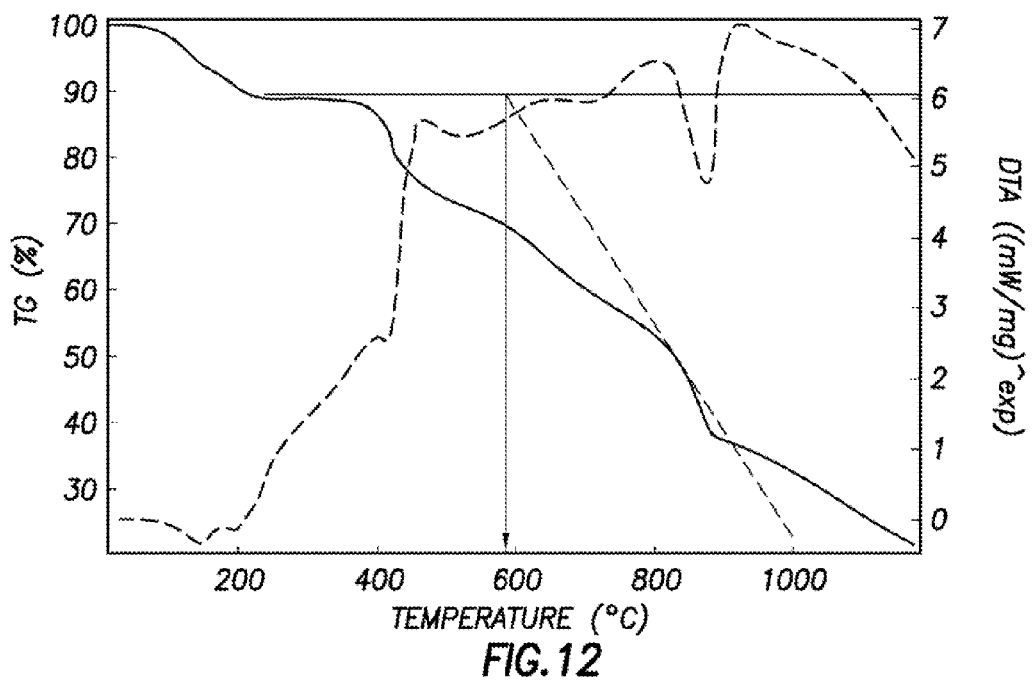
FIG. 12 illustrates the DTA and TGA results for Inventive Example 6 where the heavy solid line indicates the TGA curve, the heavy broken line indicates the DTA curve, and the arrowed line indicates the spontaneous ignition temperature.
Figure 13:
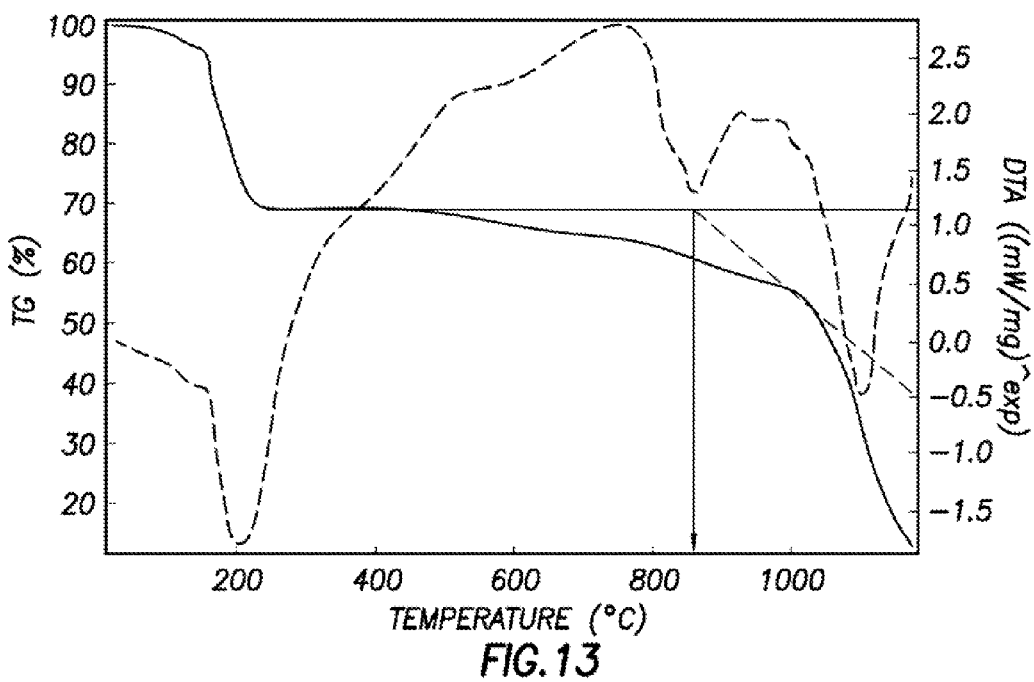
FIG. 13 illustrates the DTA and TGA results for Inventive Example 7 where the heavy solid line indicates the TGA curve, the heavy broken line indicates the DTA curve, and the arrowed line indicates the spontaneous ignition temperature.
Figure 14:
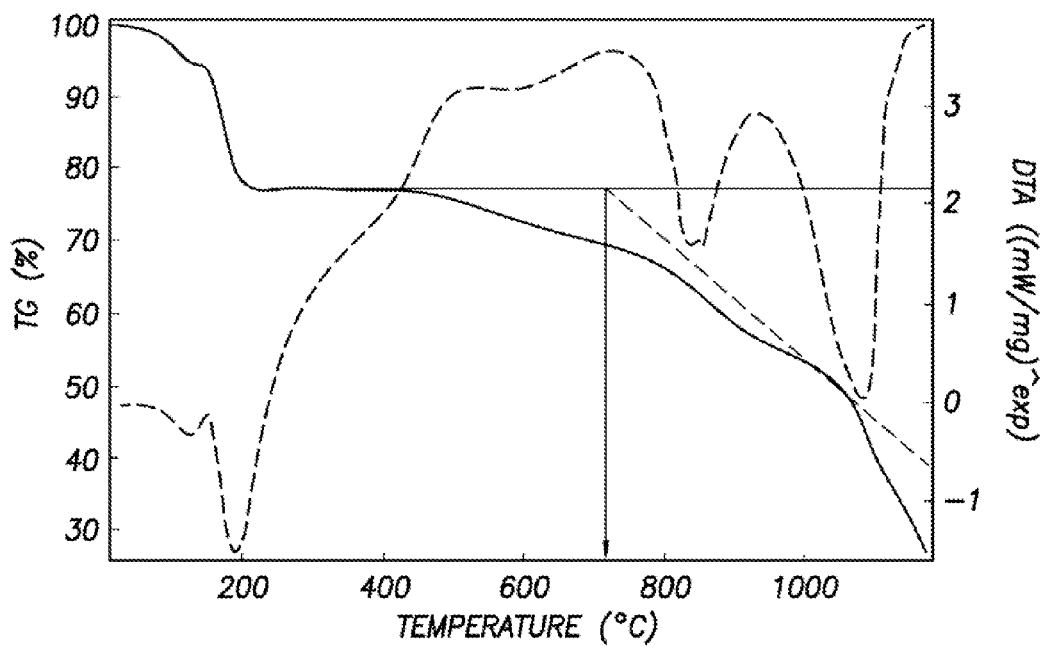
FIG. 14 illustrates the DTA and TGA results for Inventive Example 8 where the heavy solid line indicates the TGA curve, the heavy broken line indicates the DTA curve, and the arrowed line indicates the spontaneous ignition temperature.
Figure 15:
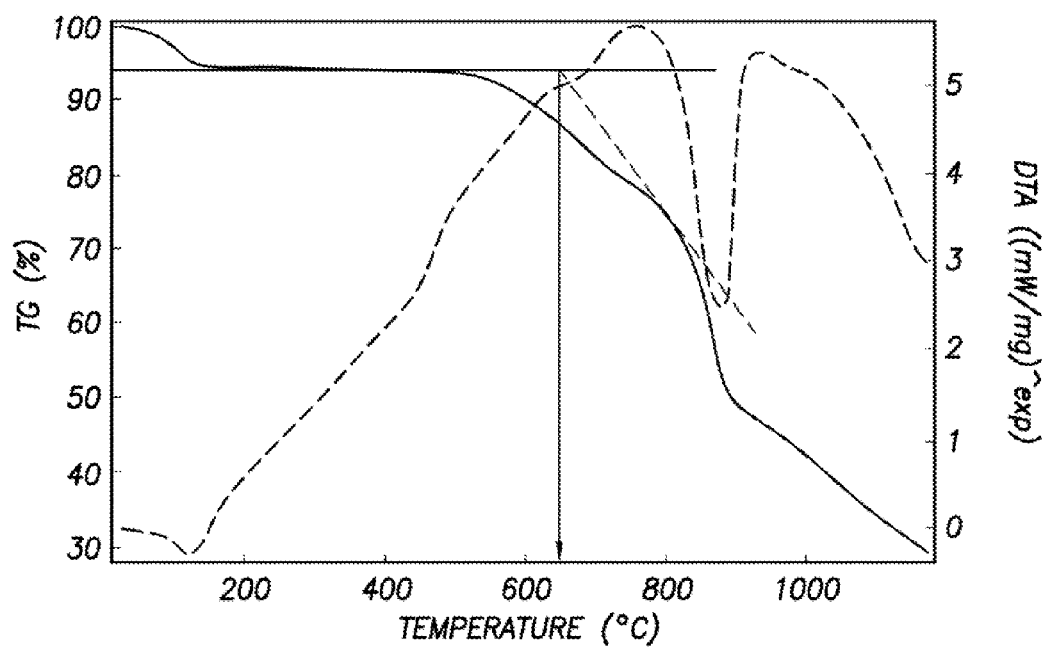
FIG. 15 illustrates the DTA and TGA results for Inventive Example 9 where the heavy solid line indicates the TGA curve, the heavy broken line indicates the DTA curve, and the arrowed line indicates the spontaneous ignition temperature.
Figure 16:
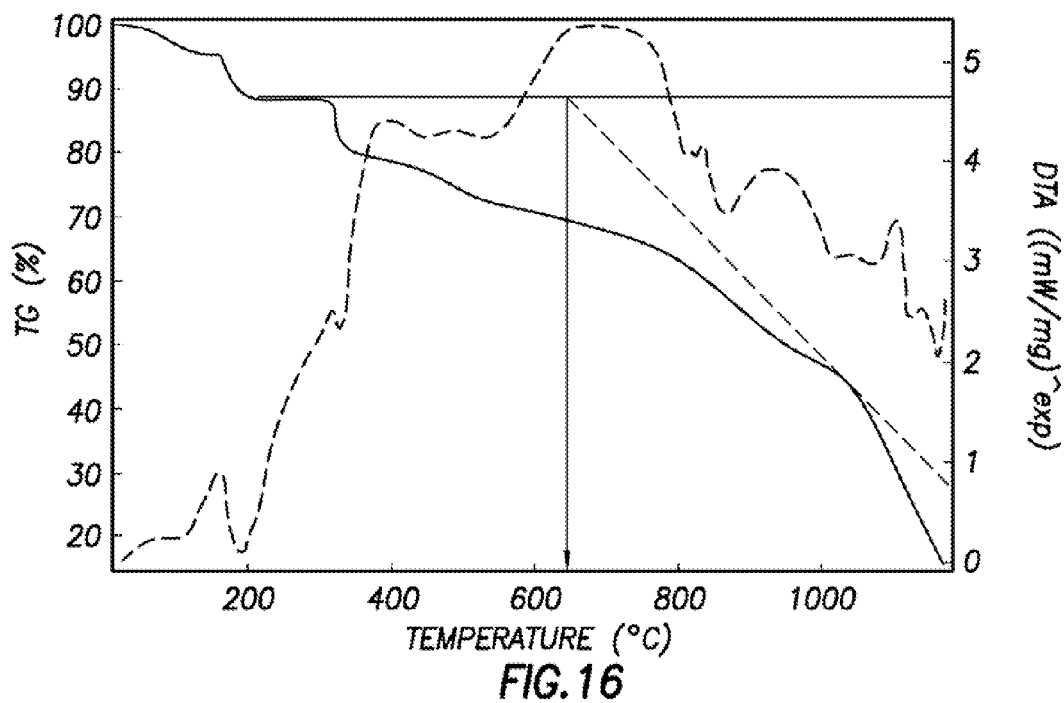
FIG. 16 illustrates the DTA and TGA results for Inventive Example 10 where the heavy solid line indicates the TGA curve, the heavy broken line indicates the DTA curve, and the arrowed line indicates the spontaneous ignition temperature.
Figure 17:
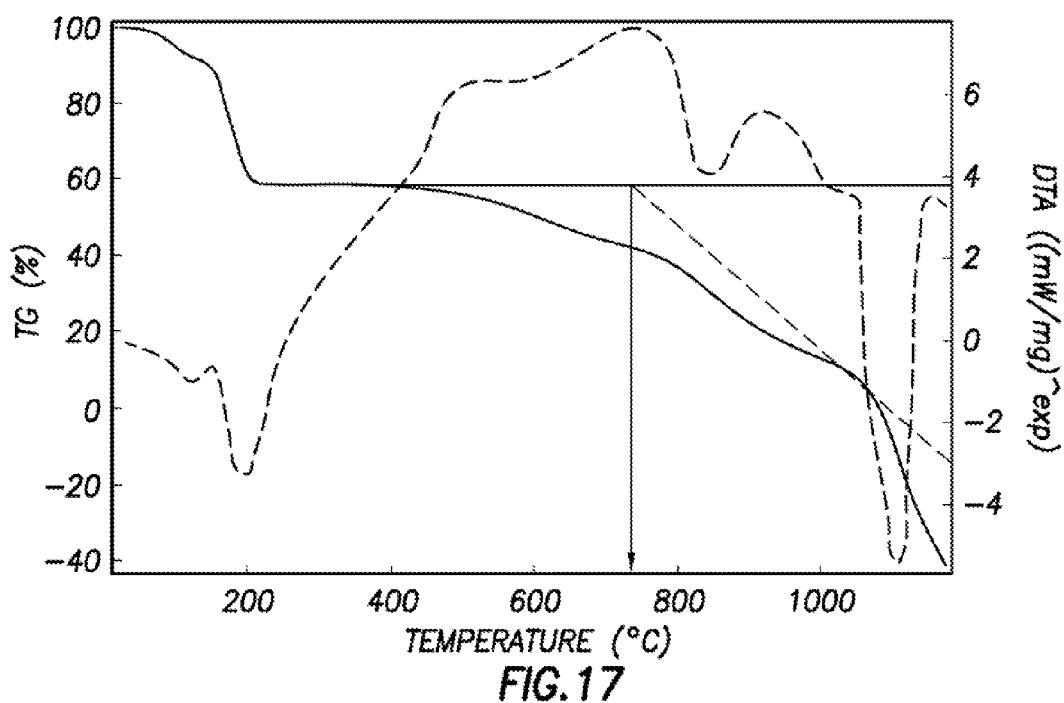
FIG. 17 illustrates the DTA and TGA results for Inventive Example 11 where the heavy solid line indicates the TGA curve, the heavy broken line indicates the DTA curve, and the arrowed line indicates the spontaneous ignition temperature.
Figure 18:
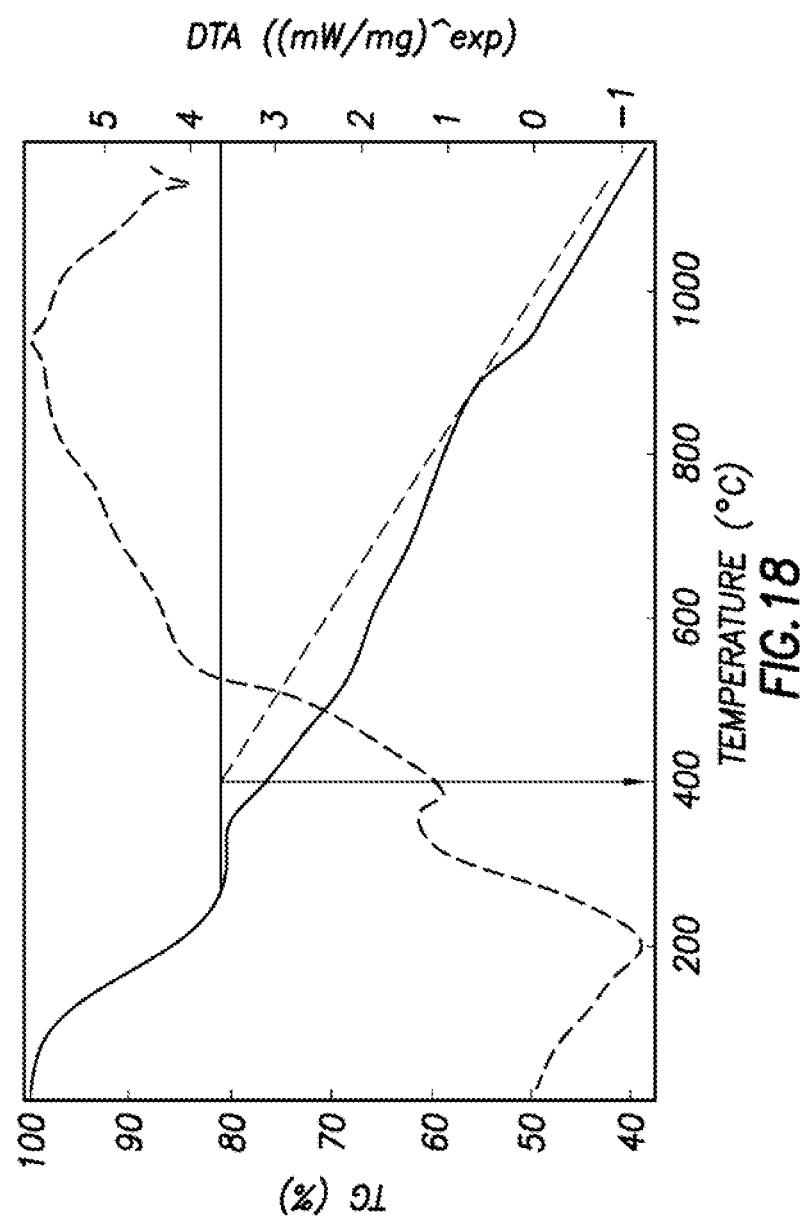
FIG. 18 illustrates the DTA and TGA results for Inventive Example 12 where the heavy solid line indicates the TGA curve, the heavy broken line indicates the DTA curve, and the arrowed line indicates the spontaneous ignition temperature.

In the DSC analysis, the SIT is defined as the intersection of the baseline and the slope at the inflection point of the sample power density (mW/mg) in the plot of power density versus temperature. Similarly, in the TGA, the SIT is defined as the intersection of the baseline and the slope at the inflection point of the sample mass in the plot of mass change versus temperature. In FIG. 6, the SIT of AAAC is determined as 300±10° C. based on the DSC curve. The graphical determination method results in an uncertainty of 10° C. In Table 6, the SITs for Inventive Examples 1-9 as well as for the pure AAAC are listed. As the Inventive Examples have strong endothermic reactions, all SITs for the Inventive Examples are determined based on the TGA curves. The baselines of mass retained are constructed after consideration of mass changes associated with endothermic reactions (See FIGS. 7-15).

Each of the Inventive Examples has much higher SITs in comparison with the AAAC reference material. For instance, the SIT of inventive Example 7 is 560° C. higher than that of AAAC. In addition, a portion of the activated carbon survives in the Inventive Examples even after heating to 1200° C., as residual activated carbon was observed after the advanced forms of activated were heated to 1200° C. Thus, the fire hazard is eliminated when using the advanced forms of activated carbon of the invention.

TABLE 6

| Samples | Spontaneous ignition temperature (SIT),° C. |
|---|---|
| Alfar Aesar activated carbon | $300 \pm 10^A$ |
| Inventive Example 1 | $550 \pm 10^A$ |
| Inventive Example 2 | $600 \pm 20^B$ |
| Inventive Example 3 | $495 \pm 15^B$ |
| Inventive Example 4 | $540 \pm 5^B$ |
| Inventive Example 5 | $575 \pm 8^B$ |
| Inventive Example 6 | $595 \pm 10^A$ |
| Inventive Example 7 | $860 \pm 10^A$ |
| Inventive Example 8 | $720 \pm 10^A$ |
| Inventive Example 9 | $650 \pm 10^A$ |
| Inventive Example 10 | $640 \pm 10^A$ |
| Inventive Example 11 | $735 \pm 10^A$ |
| Inventive Example 12 | $400 \pm 10^A$ |

[A] Assigned uncertainty based on single determination.
[B] Analytical uncertainty based on replicate determinations.

In summary, the Inventive Examples outperform the Comparative Examples in both adsorption capacities, and kinetics for adsorption of noble gases. Moreover, the Inventive Examples have adsorption capacities and kinetics comparable to those of commercially-available activated carbon. As can be seen by the very high structural ignition temperatures of Table 6, the inventive use of one or more carbon dioxide-evolving additives with, or without, structural water contained in the additives by the compositions of the Inventive Examples, the Inventive Examples do not pose a fire hazard.

The advanced, fire-resistant forms of activated carbon, according to the present invention, have high gas adsorption capacities and rapid adsorption kinetics (comparable to commercially-available activated carbon), without having any intrinsic fire hazard.

They also have superior performance to Mordenites in both adsorption capacities and kinetics. In addition, the Inventive Examples do not pose the fibrous inhalation hazard that exists with use of Mordenites.

We claim:

1. An advanced activated carbon composition comprising: between 5 and 95 wt % of one or more hydrated and/or carbonate-containing mineral; and the balance activated carbon; wherein the one or more hydrated and/or carbonate-containing mineral contains between 10 and 45 wt % water; and wherein the one or more hydrated and/or carbonate-containing mineral is hydrated magnesite.

2. The composition of claim 1, wherein the one or more hydrated and/or carbonate-containing mineral is a hydrated magnesite; and wherein the composition comprises between 22 and 27 wt % hydrated magnesite and the balance activated carbon; wherein the hydrated magnesite comprises between 15 and 17 wt % water.

3. The composition of claim 1, wherein the one or more hydrated and/or carbonate-containing mineral is a hydrated magnesite; and wherein the composition comprises between 33 and 35 wt % hydrated magnesite and the balance activated carbon; wherein the hydrated magnesite comprises between 15 and 17 wt % water.

4. The composition of claim 1, wherein the composition has a $K_{Kr}/K_{ar}$ gas adsorption selectivity ratio greater than or equal to 8.

5. The composition of claim 1, wherein the composition has a spontaneous ignition temperature (SIT) greater than or equal to 500° C.

* * * * *